(12) United States Patent
Hoffmann et al.

(10) Patent No.: US 8,715,778 B2
(45) Date of Patent: May 6, 2014

(54) BALLAST AND PROCESS FOR THE PRODUCTION OF BALLAST

(75) Inventors: Andreas Hoffmann, Köln (DE); Heinz-Dieter Ebert, Burscheid (DE); Bert Klesczewski, Köln (DE)

(73) Assignee: Bayer MaterialScience AG (DE)

( * ) Notice: Subject to any disclaimer, the term of this patent is extended or adjusted under 35 U.S.C. 154(b) by 373 days.

(21) Appl. No.: 11/654,242

(22) Filed: Jan. 17, 2007

(65) Prior Publication Data

US 2007/0172590 A1 Jul. 26, 2007

(30) Foreign Application Priority Data

Jan. 20, 2006 (DE) .......................... 10 2006 003 033

(51) Int. Cl.
| | | |
|---|---|---|
| *B05C 1/16* | (2006.01) | |
| *B05D 5/10* | (2006.01) | |
| *B05D 7/00* | (2006.01) | |
| *C08G 18/48* | (2006.01) | |
| *E01B 1/00* | (2006.01) | |

(52) U.S. Cl.
CPC .............. *C08G 18/4837* (2013.01); *E01B 1/00* (2013.01); *E01B 1/001* (2013.01)
USPC ............ 427/136; 427/212; 427/215; 427/220

(58) Field of Classification Search
CPC .............. C08G 18/48; C08G 18/4837; C08G 18/4833; C08G 18/4825; C08G 18/4829; E01B 1/00; E01B 1/001; E01B 27/00; E01B 27/02
USPC ................. 427/136, 212, 215, 220; 252/88.1; 405/258.1, 263, 272, 302.4; 404/1, 134
See application file for complete search history.

(56) References Cited

U.S. PATENT DOCUMENTS

| | | | | |
|---|---|---|---|---|
| 3,278,123 A | * | 10/1966 | Anderson | 238/2 |
| 4,114,382 A | * | 9/1978 | Kubens et al. | 405/264 |
| 4,715,746 A | * | 12/1987 | Mann et al. | 405/264 |
| 4,965,292 A | * | 10/1990 | Muller et al. | 521/110 |
| 4,985,276 A | | 1/1991 | Zeiss et al. | 427/136 |
| 5,372,844 A | | 12/1994 | Ihle et al. | 427/136 |
| 5,560,736 A | * | 10/1996 | Mehesch et al. | 405/53 |
| 5,633,293 A | * | 5/1997 | Van Court Carr et al. | 521/118 |
| 5,672,636 A | * | 9/1997 | Horn et al. | 521/167 |
| 6,699,916 B2 | * | 3/2004 | Lekovic et al. | 521/130 |

FOREIGN PATENT DOCUMENTS

| | | |
|---|---|---|
| DE | 0116649 C | 1/1901 |
| DE | 86 201 | 12/1971 |
| DE | 2063727 A1 | 8/1972 |
| DE | 2305536 A1 | 8/1974 |
| DE | 19651755 A1 | 6/1998 |
| DE | 197 11 437 C2 | 3/1999 |
| DE | 198 11 838 A1 | 9/1999 |
| GB | 2 361 731 | 10/2001 |
| GB | 2361731 A * | 10/2001 |
| JP | 06-010301 | 1/1994 |
| JP | 07166146 | 6/1995 |
| JP | 8-157552 | 6/1996 |

* cited by examiner

*Primary Examiner* — Michael Wieczorek
(74) *Attorney, Agent, or Firm* — Novak Druce Connolly Bove + Quigg LLP

(57) ABSTRACT

The present invention relates to ballast which have a high stability and a long service life and to a process for the production of ballast. These ballast are suitable for railway track laying and road construction and dike systems used for example in costal protection. These ballast comprise ballast stones and polyurethane foams based on a reaction mixture of selected polyisocyanates and selected compounds with isocyanate-reactive groups.

10 Claims, No Drawings

BALLAST AND PROCESS FOR THE PRODUCTION OF BALLAST

CROSS REFERENCE TO RELATED PATENT APPLICATION

The present patent application claims the right of priority under 35 U.S.C. §119 (a)-(d) of German Patent Application No. 10 2006 003 033.8, filed Jan. 20, 2006.

BACKGROUND OF THE INVENTION

The present invention relates to ballast and to a process for the production of ballast, which has a high stability and long service life, for railway track laying and road construction and dike systems used for example in costal protection. This ballast consists of ballast stones and a polyurethane foam based on a reaction mixture of selected polyisocyanates and selected compounds which contain isocyanate-reactive groups.

The demand for ballast used in railway track laying and road construction has increased sharply in recent years. One reason for this is certainly the general increase in population mobility and freight traffic. Rail traffic, in particular, comprises an ever-increasing proportion of high-speed trains with a large axle load. The enormous displacement forces they cause are transmitted via the rails to the sleepers and from there to the ballast. The stone formation changes over time and individual ballast stones become distorted, shifted and rounded, so the position of the tracks is changed, which requires cost-intensive and time-consuming repair work that must be carried out at regular intervals.

Various methods of consolidating ballast with the incorporation of plastics have already been described in the past. See, for example, DD 86201, DE-A 2063727, DE-A 2305536, DE-A 3941142, DE-A 19711437, DE-A 19651755, DE-A 3821963, DE-A 19811838, and JP-A 08157552.

DE-A 2063727 describes a method of reducing lateral track buckling due to lateral displacement forces. In this case, the binder is sprayed onto the ballast bed in the form of a high-viscosity plastic and the ballast stones are adhesively bonded together at the points of contact. A possible alternative is 2-dimensional adhesive bonding of the ballast stones by injection of the binder in the form of a 2-component synthetic resin.

A method of raising railway sleepers and road surfaces is described in DE-A 2305536 which requires the introduction of a swelling agent, which then solidifies. The swelling agent is, for example, a multicomponent plastic such as polyurethane foam. The liquid plastic is applied through a hole in the sleeper using a filling probe.

JP-A 8157552 describes the preparation of polyurethane resins which cure in the presence of moisture and are used to stabilize piles of stones. The polyurethane resins are prepared using aromatic polyisocyanates, monofunctional polyethers and amino-initiated polyethers, and are applied by means of spraying processes.

A common feature of all the known methods is that they produce ballast which can only be stabilized unselectively with the aid of plastics. Furthermore, in some cases the methods described rely on a relatively complicated application technology.

The object of the present invention was to provide an improved process for the production of ballast which allows stabilization of the ballast and at the same time ensures a long service life.

Surprisingly, the object of the invention could be achieved by the process of the present invention as described below.

SUMMARY OF THE INVENTION

The present invention provides a process for the production of ballast for railway track laying and road construction and dike systems. This process comprises
1) spreading out ballast stones to form ballast, and
2) applying a polyurethane foam forming reaction mixture between the spread ballast stones, wherein the reaction mixture is prepared from:
  a) one or more isocyanate compounds selected from the group consisting of (I) one or more polyisocyanates having an NCO group content of 28 to 50 wt. % and (II) one or more NCO prepolymers having an NCO group content of 10 to 48 wt. %, which are prepared from one or more polyisocyanates having an NCO group content of 28 to 50 wt. %, and at least one hydroxyl group containing compound selected from the group consisting of one or more polyetherpolyols having a hydroxyl number of 6 to 112, one or more polyoxyalkylenediols having a hydroxyl number of 113 to 1100 and one or more alkylenediols having a hydroxyl number of 645 to 1850;
  and
  b) a polyol component comprising one or more polyether polyols having a hydroxyl number of 6 to 112 and a functionality of 1.8 to 8;
  in the presence of
  c) 0 to 26 wt. %, based on 100% by weight of the sum of reaction components b) through g), of one or more chain extenders having a hydroxyl number or an amine number of 245 to 1850 and a functionality of 1.8 to 8;
  d) 0.05 to 5 wt. %, based on 100% by weight of the sum of reaction components b) through g), of one or more blowing agents;
  e) 0 to 5 wt. %, based on 100% by weight of the sum of reaction components b) through g), of one or more catalysts;
  f) 0 to 50 wt. %, based on 100% by weight of the sum of reaction components b) through g), of one or more fillers;
  and
  g) 0 to 25 wt. %, based on 100% by weight of the sum of reaction components b) through g), of one or more auxiliary substances and/or additives;
  in which the isocyanate index of the reaction mixture ranges from 70 to 130.

DETAILED DESCRIPTION OF THE INVENTION

As used herein, the term Isocyanate Index is understood as meaning the equivalent ratio of NCO groups to OH groups and NH groups, multiplied by 100. Thus, for example, an isocyanate index of 110 means that there are 1.1 reactive NCO groups from the isocyanate compounds per reactive OH group and/or NH group, or that there are 0.91 reactive OH groups and/or NH groups per reactive NCO group from the isocyanate compounds.

The suitable components for preparing the polyurethane foams are used in a mixing ratio that allows homogeneous mixing of the components, especially when using high-pressure machines. The use of high-pressure machines also makes it possible to process quick-reacting PUR systems, and hence affords an economic process. In addition, the processing properties of the PUR system can be optimized to requirements by using the raw materials described in greater detail below. Thus, one possible application method is a partial foaming of the ballast using pouring technology. Furthermore, the mechanical properties of the polyurethane foams used can be varied within wide limits. The advantages of the PUR foams used are good compression forces (at 10% compression) (≥10.0N), good compression hardness (at 10% compression) (≥1.0 kPa) and tensile strengths (≥0.1 MPa) coupled with a low compression set (CS (40%, 25° C., 5 min) ≤0.01%).

The polyurethane foams of the present invention are preferably prepared in the presence of chain extenders and catalysts. It is preferable here to use catalysts which have primary and/or secondary hydroxyl and/or amino groups. The polyurethanes obtained in this way have an improved emission behavior and, after extraction with solvents (e.g. water), are distinguished by a reduced proportion of mobilizable ingredients. Optionally, the polyurethane foams according to the invention can additionally contain fillers, auxiliary substances and/or additives which are known per se from polyurethane chemistry.

The present invention also provides ballast consisting of polyurethane foam and ballast stones. In accordance with the invention, the ballast herein is characterized in that the polyurethane foam is located between the ballast stones. The suitable polyurethane foam is prepared from a reaction mixture comprising:

a) one or more isocyanate compounds selected from the group consisting of (I) polyisocyanates having an NCO group content of 28 to 50 wt. %, and (II) NCO prepolymers having an NCO group content of 10 to 48 wt. % and which comprise the reaction product of one or more polyisocyanates having an NCO group content of 28 to 50 wt. %, with a hydroxyl group containing compound selected from the group consisting of one or more polyetherpolyols having a hydroxyl number of 6 to 112, one or more polyoxyalkylenediols having a hydroxyl number of 113 to 1100 and one or more alkylenediols having a hydroxyl number of 645 to 1850;
and
b) a polyol component comprising one or more polyetherpolyols having a hydroxyl number of 6 to 112 and a functionality of 1.8 to 8;
in the presence of
c) 0 to 26 wt. %, based on 100% by weight of the sum of reaction components b) through g), of one or more chain extenders with a hydroxyl number or amine number of 245 to 1850 and a functionality of 1.8 to 8;
d) 0.05 to 5 wt. %, based on 100% by weight of the sum of reaction components b) through g), of one or more blowing agents;
e) 0 to 5 wt. %, based on 100% by weight of the sum of reaction components b) through g), of one or more catalysts;
f) 0 to 50 wt. %, based on 100% by weight of the sum of reaction components b) through g), of one or more fillers;
and g) 0 to 25 wt. %, based on 100% by weight of the sum of reaction components b) through g), of one or more auxiliary substances and/or additives;
wherein the isocyanate index of the reaction mixture ranges from 70 to 130.

With regard to processing, the reaction mixture for preparation of the polyurethane foam is adjusted so that it can be used with a simple application technology such as, for example, the pouring process. A partial foaming of the ballast can be effected, for example, by specific adjustment of the reactivity of the reaction mixture. Such a partial foaming makes it possible on the one hand, to selectively strengthen the ballast in particularly stressed regions (such as e.g. curves, and load dissipation regions) and on the other hand, allows the uninhibited drainage of liquids such as water. The effect of an excessively slow reaction would be that the reaction mixture drained into the soil or marginal regions of the ballast bed. The effect of an excessively rapid reaction would be that the reaction mixture did not penetrate to a sufficient depth in the layers of bulk material. For example, for a track system with a ballast height of approx. 40 cm, a suitable initiation time for the reaction mixture should range from 1 to 15 seconds, preferably from 1 to 5 seconds, and a suitable solidification time (i.e. curing time) for the reaction mixture should range from 15 to 45 seconds, preferably from 15 to 30 seconds. Although longer solidification times are possible, they are not economical. Thus, longer solidification times are not typically used.

The polyurethane foams suitable for the present invention should preferably have a compression force (at 10% compression) of at least 10.0N, a compression hardness (at 10% compression) of at least 1.0 kPa and a tensile strength of at least 0.1 MPa. Furthermore, these polyurethane foams should also preferably have a compression set (CS) (40%, 25° C., 5 min) of at most 0.01% and a good stability to weathering and hydrolysis. The polyurethane foam used should also be distinguished by the having the lowest possible proportion of emissible and mobilizable ingredients.

Suitable polyisocyanates to be used as component a) herein include (cyclo)aliphatic and/or aromatic polyisocyanates, and preferably toluene diisocyanate, and diisocyanates and/or polyisocyanates of the diphenylmethane series which have an NCO group content of 28 to 50 wt. %. Diisocyanates of the diphenylmethane series includes, for example, mixtures of 4,4'-diisocyanato-diphenylmethane with 2,4'-diisocyanato-diphenylmethane and, optionally, a small proportion of 2,2'-diisocyanatodiphenylmethane, with the mixtures being liquid at room temperature, and, which may optionally be appropriately modified. Other suitable polyisocyanates to be used as component a) include polyisocyanate mixtures of the diphenylmethane series which are liquid at room temperature, and contain not only the isomers mentioned above but also contain their higher homologues, and which are obtainable in a manner known per se by the phosgenation of aniline/formaldehyde condensation products. Modified products of these diisocyanates and/or polyisocyanates which have urethane or carbodiimide groups and/or allophanate or biuret groups are also suitable.

Suitable NCO prepolymers having an NCO group content of 10 to 48 wt. % are also suitable to be used as component a) herein. These prepolymers are prepared from the above-mentioned polyisocyanates and at least one hydroxyl group containing compound. Suitable hydroxyl group containing compounds are selected from the group consisting of one or more polyether polyols having a hydroxyl number of 6 to 112, one or more polyoxyalkylenediols having a hydroxyl number of 113 to 1100, one or more alkylenediols having a hydroxyl number of 645 to 1850 and mixtures thereof.

Suitable compounds to be used as component b) include polyhydroxy polyethers which can be prepared in a manner known per se by the polyaddition of alkylene oxides onto suitable polyfunctional starter compounds in the presence of catalysts. The polyhydroxy polyethers are preferably prepared from a starter compound having an average of 2 to 8 active hydrogen atoms, and one or more alkylene oxides. Preferred starter compounds include molecules with two to eight hydroxyl groups per molecule, such as water, ethylene glycol, propylene glycol, diethylene glycol, dipropylene glycol, triethylene glycol, tripropylene glycol 1,4-butanediol, 1,6-hexanediol, triethanolamine, glycerol, trimethylolpropane, pentaerythritol, sorbitol and sucrose. The starter compounds can be used either alone or in a mixture with other suitable starter compounds. These polyols used as component b) are typically prepared from one or more alkylene oxides, the alkylene oxides used preferably being oxirane, methyloxirane and ethyloxirane. The alkylene oxides can also be used either alone or in a mixture with other alkylene oxides. When used in a mixture, the alkylene oxides can be reacted randomly and/or in blocks. Higher-molecular weight polyhydroxy polyethers in which high-molecular polyadducts/polycondensation products or polymers are in finely dispersed, dissolved or grafted form are also suitable. Such modified polyhydroxyl compounds are obtained, for example, by allowing polyaddition reactions (e.g. reactions between polyisocyanates and amino-functional compounds) or polycondensation reactions (e.g. between formaldehyde and phenols and/or amines) to proceed in situ in the polyhydroxy polyether compounds used as component b) which contain hydroxyl groups (as described in, for example, DE-AS 1 168 075, the disclosure of which is hereby incorporated by reference). Polyhydroxyl compounds modified by vinyl polymers, such as those obtained e.g. by the polymerization of styrene and/or acrylonitrile in the presence of polyether polyols (as described in, for example, U.S. Pat. No. 3,383,351, the disclosure of which is hereby incorporated by reference), are also suitable as polyol component b) for the process according to the invention. Other suitable representatives of hydroxyl group containing compounds to be used component b) herein are described in, for example, Kunststoff-Handbuch, volume VII "Polyurethane", 3rd edition, Carl Hanser Verlag, Munich/Vienna, 1993, pages 57-67 and pages 88-90.

In accordance with the present invention, component b) preferably comprises one or more polyhydroxy polyethers which have a hydroxyl number of 6 to 112, preferably of 21 to 56, and a functionality of 1.8 to 8, preferably of 1.8 to 6.

Suitable chain extenders to be used as component c) in accordance with the present invention include those having a mean hydroxyl number or a mean amine number of 245 to 1850 and a functionality of 1.8 to 8, preferably of 1.8 to 3. Examples which may be mentioned here include ethylene glycol, propylene glycol, diethylene glycol, dipropylene glycol, 1,4-butanediol, 1,6-hexanediol, triethanolamine, glycerol, trimethylolpropane and other short-chain alkoxylation products. Component c) is preferably used in amounts ranging from 0 to 26 wt. %, based on 100% by weight of the sum of reaction components b) through g). It is particularly preferable to use ethylene glycol, 1,4-butanediol, the propoxylation product of trimethylolpropane (having an OH number of 550) and/or a mixture of triethanolamine and diisopropanolamine (having an OH number of 1160) as chain extenders in the present invention.

Suitable blowing agents to be used as component d) in accordance with the present invention include both physical blowing agents and water. Preferable physical blowing agents d) are 1,1-difluoroethane (HFC-152a), 1,1,1,2-tetrafluoroethane (HFC-134a), 1,1,1,2,3,3,3,-heptafluoropropane (HFC-227ea), 1,1,1,3,3-pentafluoropropane (HFC-245fa), 1,1,1,3,3-pentafluorobutane (HFC-365mfc), n-pentane, i-pentane, i-hexane or mixtures thereof. Water is most preferably used as component d). The blowing agents can be used by themselves or in combination with each other and are present in amounts ranging from 0.05 to 5 wt. %, and more preferably in amounts ranging from 0.3 to 3.5 wt. %, based on 100% by weight of the sum of reaction components b) through g).

The intrinsically slow reaction between isocyanate groups and hydroxyl groups can be accelerated by the addition of e) one or more catalysts. Particularly suitable catalysts e) include tertiary amines of the type known per se, such as, for example, triethylamine, tributylamine, N-methylmorpholine, N-ethylmorpholine, N-cocomorpholine, N,N,N',N'-tetramethylethylenediamine, 1,4-diaza-bicyclo[2.2.2]octane, N-methyl-N'-dimethylaminoethylpiperazine, N,N-dimethylcyclohexylamine, N,N,N',N'-tetramethyl-1,3-butanediamine, N,N-dimethyl-imidazo-β-phenylethylamine, 1,2-dimethylimidazole, bis(2-dimethylaminoethyl)ether or 2-methylimidazole. It is also possible to use organic metal catalysts such as organic bismuth catalysts such as, for example, bismuth(III)neodecanoate, or organic tin catalysts such as, for example, tin(II) salts of carboxylic acids, such as tin(II)acetate, tin(II)octanoate, tin(II)ethylhexanoate and tin (II)laurate, and the dialkyltin salts of carboxylic acids, e.g. dibutyltin diacetate, dibutyltin dilaurate, dibutyltin maleate and/or dioctyltin diacetate, by themselves, or in combination with one or more of the tertiary amine catalysts. It is preferable to use catalysts having primary and/or secondary hydroxyl and/or amino groups, suitable catalysts being both incorporable amines and incorporable organic metal catalysts of the type known per se, e.g. N-(3-dimethylaminopropyl)-N,N-diisopropanolamine, N,N,N'-trimethyl-N'-hydroxyethylbisaminoethyl ether, tetramethyl-dipropylenetriamine, 3-(dimethylamino)propylurea and tin ricinoleate. The catalysts can be used by themselves or in combination with each other. It is preferable to use from 0 to 5.0 wt. %, and more preferable to use from 0.5 to 5.0 wt. %, of catalyst or catalyst combination, based on 100% by weight of the sum of reaction components b) through g). Other representatives of catalysts and particulars of the mode of action of the catalysts are described in Kunststoff-Handbuch, volume VII "Polyurethane", 3rd edition, Carl Hanser Verlag, Munich/Vienna, 1993, pages 104-110.

Suitable fillers to be used as component f) which are optionally used concomitantly can be both inorganic fillers and organic fillers. Examples of inorganic fillers which may be mentioned are silicate minerals such as sheet silicates, metal oxides such as iron oxides, pyrogenic metal oxides such as aerosils, metal salts such as baryte, inorganic pigments such as cadmium sulfide and zinc sulfide, glass, glass microspheres, hollow glass microspheres, etc. It is possible to use natural and synthetic fibrous minerals such as wollastonite and glass fibers of different length, which can optionally be sized. Examples of organic fillers which may be mentioned are crystalline paraffins or fats, and powders based on polystyrene, polyvinyl chloride, urea/formaldehyde compounds and/or polyhydrazodicarbonamides (which can be prepared, for example, from hydrazine and toluene diisocyanate). Hollow microspheres of organic origin, or cork, can also be used. The organic fillers or inorganic fillers can be used either individually or as mixtures. The fillers f) are preferably added in amounts of from 0 to 50 wt. %, preferably of from 0 to 30 wt. %, based on 100% by weight of the sum of reaction components b) through g).

The auxiliary substances and additives, i.e. component g), which are optionally used concomitantly include e.g. stabilizers, coloring agents, flameproofing agents, plasticizers and/or monohydric alcohols.

The stabilizers used are preferably surface-active substances, i.e. compounds which serve to assist the homogenization of the starting materials and are optionally also suitable for regulating the cellular structure of the plastics. Examples which may be mentioned are emulsifiers such as, for example, the sodium salts of sulfated castor oil or fatty acids and salts of fatty acids with amines, foam stabilizers such as siloxane/alkylene oxide copolymers, and cell regulators such as paraffins. The stabilizers used are predominantly water-soluble organopolysiloxanes. These include polydimethylsiloxane residues onto which a polyether chain of ethylene oxide and propylene oxide is grafted. The surface-active substances are preferably added in amounts of from 0.01 to 5.0 wt. %, preferably of from 0.1 to 1.5 wt. %, based on 100% by weight of the sum of reaction components b) through g).

Coloring agents which can be used as an additive, i.e. component g), include organically and/or inorganically based dyestuffs and/or colored pigments which are known per se as suitable for coloring polyurethanes. Examples of these include iron oxide and/or chromium oxide pigments and phthalocyanine-based and/or monoazo-based pigments.

Examples of suitable flameproofing agents which are optionally to be used concomitantly are tricresyl phosphate, tris-2-chloroethyl phosphate, tris-chloropropyl phosphate and tris-2,3-dibromopropyl phosphate. Apart from the halogen-substituted phosphates already mentioned, it is also possible to use inorganic flameproofing agents such as hydrated aluminium oxide, ammonium polyphosphate, calcium sulfate, sodium polymetaphosphate or amine phosphates, e.g. melamine phosphates.

Examples of plasticizers which may be mentioned as suitable additives, i.e. component g) herein, are esters of polybasic or, preferably, dibasic carboxylic acids with monohydric alcohols. The acid component of such esters can be derived e.g. from succinic acid, isophthalic acid, trimellitic acid, phthalic anhydride, tetrahydrophthalic and/or hexahydrophthalic anhydride, endo-methylenetetrahydrophthalic anhydride, glutaric anhydride, maleic anhydride, fumaric acid and/or dimeric and/or trimeric fatty acids, optionally mixed with monomeric fatty acids. The alcohol component of such esters can be derived, for example, from branched and/or unbranched aliphatic alcohols having from 1 to 20 carbon atoms. Such alcohols include methanol, ethanol, propanol, isopropanol, n-butanol, sec-butanol, tert-butanol and the various isomers of pentyl alcohol, hexyl alcohol, octyl alcohol (e.g. 2-ethylhexanol), nonyl alcohol, decyl alcohol, lauryl alcohol, myristyl alcohol, cetyl alcohol and stearyl alcohol, and/or from fatty and waxy alcohols that are naturally occurring or obtainable by the hydrogenation of naturally occurring carboxylic acids. Other possible alcohol components are cycloaliphatic and/or aromatic hydroxyl compounds, e.g. cyclohexanol and its homologues, phenol, cresol, thymol, carvacrol, benzyl alcohol and/or phenylethanol. Other possible plasticizers are esters of the above-mentioned alcohols with phosphoric acid. Optionally, phosphoric acid esters of halogenated alcohols, e.g. trichloroethyl phosphate, can also be used. In the latter case a flame-inhibiting effect can be achieved at the same time as the plasticizing effect. Of course, mixed esters of the above-mentioned alcohols and carboxylic acids can also be used. The plasticizers can also be so-called polymeric plasticizers, e.g. polyesters of adipic, sebacic and/or phthalic acid. Alkylsulfonic acid esters of phenol, e.g. phenyl paraffinsulfonate, can also be used as plasticizers.

Other auxiliary substances and/or additives g) which are optionally to be used concomitantly are monohydric alcohols such as butanol, 2-ethylhexanol, octanol, dodecanol or cyclohexanol, which can optionally be used concomitantly to bring about a desired chain termination.

The auxiliary substances and/or additives g) are preferably added in amounts of from 0 to 25 wt. %, more preferably of from 0 to 10 wt. %, based on 100% by weight of the sum of reaction components b) through g). Further information on the conventional auxiliary substances and additives, i.e. component g) herein, can be found in the scientific literature, e.g. in Kunststoff-Handbuch, volume VII "Polyurethane", 3rd edition, Carl Hanser Verlag, Munich/Vienna, 1993, page 104 et seq.

In principle, the polyurethane foams suitable herein can be produced in a variety of ways, including, for example, by the one-shot process or the prepolymer process. In the one-shot process, all the components, e.g. polyols, polyisocyanates, chain extenders, blowing agents, catalysts, fillers and/or additives, are brought together and intimately mixed. In the prepolymer process, the first step is to prepare an NCO prepolymer by reacting part of the polyol component with all the polyisocyanate component, after which the remainder of the polyol and any chain extenders, blowing agents, catalysts, fillers and/or additives are added to the resulting NCO prepolymer and intimately mixed. A particularly preferred process in terms of the present invention is one in which the components b) through g) are mixed to form a so-called "polyol component", which is then processed with the polyisocyanate and/or NCO prepolymer used as component a). The chain extenders, blowing agents, catalysts, fillers, auxiliary substances and/or additives which are optionally to be used concomitantly are generally added to the "polyol component", as described above, although this is not absolutely necessary because any of the components which are compatible with the polyisocyanate component a) and do not react therewith can also be incorporated into the polyisocyanate component a).

In accordance with the present invention, the mixture formed by thorough mixing of the polyurethane foam forming reaction components is applied to the ballast stones, for example, by the pouring process, where the feeding, proportioning and mixing of the individual components or component mixtures are effected by means of the devices known per se in polyurethane chemistry. The amount of mixture introduced is generally proportioned so that the polyurethane foam has a free-rise density of from 20 to 800 $kg/m^3$, preferably of from 30 to 600 $kg/m^3$ and more preferably of from 50 to 300 $kg/m^3$. The starting temperature of the reaction mixture applied to the ballast stones is generally chosen in the range from 20 to 80° C., preferably from 25 to 40° C. The ballast stones are optionally dried and heated before the reaction mixture is introduced. Depending on the reaction components, the catalysts added and the temperature control, the solidification time (i.e. curing time) of the polyurethane foam can range from 15 to 45 seconds, and preferably from 15 to 30 seconds. Longer solidification times are possible, but not economical.

The present invention will be illustrated in greater detail with the aid of the Examples below.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts and percentages by weight, respectively.

EXAMPLES

The following components were used in Examples 1 to 9:
Polyol 1: a polyetherpolyol prepared by the propoxylation of 1,2-propylene glycol and subsequent ethoxylation; having an OH number of 28 and a functionality of 2.

Polyol 2: a polyetherpolyol prepared by the propoxylation of glycerol and subsequent ethoxylation; having an OH number of 35 and a functionality of 3.

Polyol 3: a polyetherpolyol prepared by the propoxylation of glycerol and subsequent ethoxylation; having an OH number of 27.5 and a functionality of 3.

Polyol 4: a polyetherpolyol prepared by the propoxylation of glycerol and subsequent ethoxylation; having an OH number: 28 and a functionality of 3.

Polyol 5: a polyetherpolyol prepared by the propoxylation of sorbitol and subsequent ethoxylation; having an OH number: 28.5 and a functionality of 6.

Polyol 6: a polyurea filled polyetherpolyol (polyurea dispersion (PHD), solids content about 20%), prepared by the propoxylation of glycerol and subsequent ethoxylation; having an OH number of 28, a viscosity (at 25° C.) of 3600 mPa·s and a functionality of 3; commercially available as Desmophen® VP.PU7619W from Bayer MaterialScience AG.

Chain Extender 1: a polyetherpolyol prepared by the propoxylation of trimethylolpropane; having an OH number: 550.

Chain Extender 2: 1,4-butanediol; having an OH number: 1245.

Chain Extender 3: monoethylene glycol; having an OH number: 1813.

Chain Extender 4: a mixture of triethanolamine (55 wt. %) and diisopropanolamine (45 wt. %); having an OH number: 1160.

Catalyst 1: dibutylbis[dodecylthio]stannane (commercially available as Fomrez® UL1 from GE Bayer Silicones)

Catalyst 2: bis(dimethylaminoethyl) ether (commercially available as NIAX® A-1 from GE Bayer Silicones)

Catalyst 3: triethylenediamine (commercially available as Dabco® S-25 from Air Products)

Catalyst 4: tin octanoate (commercially available as Addocat® SO from Rhein Chemie Rheinau)

Catalyst 5: triethylenediamine (commercially available as Dabco® 33-LV from Air Products)

Catalyst 6: tin ricinoleate (commercially available as Kosmos® EF from Goldschmidt)

Catalyst 7: N,N,N'-trimethyl-N'-hydroxyethylbisaminoethyl ether (commercially available as Jeffcat® ZF-10 from Huntsman)

Stabilizer 1: TEGOSTAB® B8719LF (commercially available from Goldschmidt AG; an organo-modified polysiloxane)

Stabilizer 2: TEGOSTAB® B8681LF (commercially available from Goldschmidt AG; an organo-modified polysiloxane)

Isocyanate 1: an isocyanate prepolymer having an NCO group content of 19.8% and a viscosity at 25° C. of 700 mPa·s; prepared from 4,4'-MDI, carbodiimide-modified 4,4'-MDI and a polyoxyalkylenepolyol having an OH number of 164; commercially available as Desmodur® VP.PU10IS14 from Bayer MaterialScience AG.

Isocyanate 2: an isocyanate prepolymer having an NCO group content of 24.5% and a viscosity at 25° C. of 440 mPa·s; prepared from an MDI mixture obtained by the phosgenataion of aniline/formaldehyde condensation products and polyoxyalkylenediols having an OH number of 515; commercially available as Desmodur® PA09 from Bayer MaterialScience AG.

Isocyanate 3: an isocyanate prepolymer having an NCO group content of 28.4% and a viscosity at 25° C. of 91 mPa·s; prepared from an MDI mixture obtained by the phosgenation of aniline/formaldehyde condensation products and a polyetherpolyol having an OH number of 28; commercially available as Desmodur® VP.PU1805 from Bayer MaterialScience AG.

Isocyanate 4: a mixture of 2,4-toluene diisocyanate and 2,6-toluene diisocyanate having an NCO group content of 48% and a viscosity at 25° C. of 3 mPa·s; commercially available as Desmodur® T80 from Bayer MaterialScience AG.

Procedure:

The first step of the preparation of the so-called "polyol component" was to homogenize x parts by weight of polyetherpolyol and any chain extender, catalyst, stabilizer and blowing agent (see Table 1 for mixing proportions). Then, y parts by weight of polyisocyanate were added (see Table 1 for mixing proportions), and the ingredients were mixed for 10 seconds (using a PENDRAULIK LM34 laboratory mixer, at 3000 rpm). The initiation time and curing time were determined from the start of stirring.

The following properties of the resulting polyurethane foams were determined: free-rise density (according to DIN EN ISO 845), compression set (CS; according to DIN EN ISO 1856), compression force (according to DIN EN ISO 3386-1-98), compression hardness (according to DIN EN ISO 3386-1-98) and tensile strength (according to DIN EN ISO 1798). The CS value was determined one day after compression under the conditions given in Table 1. The compression force value was determined using a polyurethane foam sample with a base area of about 64 cm².

TABLE 1

|  | Example | | | | | | | | |
| --- | --- | --- | --- | --- | --- | --- | --- | --- | --- |
|  | 1* | 2* | 3 | 4 | 5 | 6 | 7 | 8 | 9 |
| Polyol 1 | 37.8 | 40.8 | 42.6 | 50 | 50 | 50 | 69.6 |  |  |
| Polyol 2 | 30 | 30 | 33 | 41.5 | 44.8 | 42.7 |  | 95.3 |  |
| Polyol 3 |  |  |  |  |  |  | 23 |  |  |
| Polyol 4 |  |  |  |  |  |  |  |  | 25 |
| Polyol 5 |  |  |  |  |  |  |  |  | 44.65 |
| Polyol 6 |  |  |  |  |  |  |  |  | 25 |
| Chain Extender 1 | 30 | 27 | 22 |  |  |  |  |  |  |
| Chain Extender 2 |  |  |  | 4 |  |  | 5 |  |  |
| Chain Extender 3 |  |  |  | 2 | 4 | 4 |  |  |  |
| Chain Extender 4 |  |  |  |  |  |  |  |  | 1.5 |
| Catalyst 1 | 0.1 | 0.1 | 0.1 |  |  |  | 0.3 |  |  |
| Catalyst 2 | 0.7 | 0.7 | 0.7 | 0.9 |  |  | 0.3 | 0.4 |  |
| Catalyst 3 | 1.0 | 1.0 | 1.2 | 1.2 |  |  | 1.4 | 0.7 |  |
| Catalyst 4 |  |  |  |  |  |  |  |  | 0.4 |
| Catalyst 5 |  |  |  |  |  |  |  |  | 0.2 |
| Catalyst 6 |  |  |  |  |  | 0.9 |  |  |  |

TABLE 1-continued

| | Example | | | | | | | | |
|---|---|---|---|---|---|---|---|---|---|
| | 1* | 2* | 3 | 4 | 5 | 6 | 7 | 8 | 9 |
| Catalyst 7 | | | | | | 3.0 | | | |
| Stabilizer 1 | | | | | | | | 0.3 | |
| Stabilizer 2 | | | | | | | | | 0.25 |
| Water | 0.4 | 0.4 | 0.4 | 0.4 | 0.3 | 0.3 | 0.4 | 3.3 | 3.0 |
| Isocyanate 1 | | | | | | | 48 | | |
| Isocyanate 2 | 68 | 60 | 56 | 47 | 40 | 42 | | | |
| Isocyanate 3 | | | | | | | | 64 | |
| Isocyanate 4 | | | | | | | | | 40 |
| free-rise density [kg m$^{-3}$] | 200 | 218 | 220 | 190 | 221 | 224 | 230 | 58 | 30 |
| Initiation time [s] | 10 | 10 | 10 | 10 | 10 | 10 | 10 | 8 | 10 |
| Curing time [s] | 40 | 40 | 40 | 40 | 40 | 40 | 40 | 40 | 60 |
| CS (40%, 25° C., 5 min) [%] | 7.5 | 0.4 | 0 | 0 | 0 | 0 | 0 | 0 | 0 |
| Compression force (10%) [N] | 3300 | 1300 | 740 | 96 | 147 | 70 | 73 | 23 | 11 |
| Compression hardness (10%) [kPa] | 675 | 376 | 197 | 27 | 23 | 11 | 21 | 4.8 | 2.3 |
| Tensile strength [MPa] | 1.23 | 0.95 | 0.76 | 0.32 | 0.23 | 0.29 | 0.48 | 0.17 | 0.10 |

In all of Examples 1 to 9 the index was adjusted to 100.
In Comparative Examples 1* and 2* foams with compression set were obtained (CS > 0.01%).

These foams are unsuitable for the consolidation of ballast stones for ballast. In Examples 5 and 6 incorporable catalysts were used to give foams with a low proportion of emissible or mobilizable ingredients.

With the reaction mixtures of Examples 3 to 9 according to the invention, ballast can be stabilized outstandingly well, even in the long term.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of ballast for railway track laying and road construction and dike systems, said ballast comprising a polyurethane foam and ballast stones, said process comprising:
   1) spreading out ballast stones, and
   2) applying a polyurethane foam forming reaction mixture between the spread out ballast stones, wherein the polyurethane foam forming reaction mixture consists of:
      a) one or more isocyanate compounds selected from the group consisting of (I) polyisocyanates having an NCO group content of 28 to 50 wt. % and (II) NCO prepolymers having an NCO group content of 10 to 48 wt. %, in which the NCO prepolymers comprise the reaction product of one or more polyisocyanates having an NCO group content of 28 to 50 wt. %, with a hydroxyl group containing compound selected from the group consisting of one or more polyetherpolyols having a hydroxyl number of 6 to 112, one or more polyoxyalkylenediols having a hydroxyl number of 113 to 1100, one or more alkylenediols having a hydroxyl number of 645 to 1850 and mixtures thereof;
      b) at least one or more polyetherpolyols having a hydroxyl number of 21 to 56 and a functionality of 1.8 to 8; in the presence of
      c) up to 26% by weight, based on 100% by weight of the sum of reaction components b) through g), of one or more chain extenders selected from the group consisting of ethylene glycol, propylene glycol, diethylene glycol, dipropylene glycol, 1,4-butanediol, 1,6-hexanediol, triethanolamine, glycerol, trimethylolpropane, and short-chain alkoxylation products having a hydroxyl number in the range of from 245 to 1850;
      d) 0.05 to 5% by weight, based on 100% by weight of the sum of reaction components b) through g), of one or more blowing agents;
      e) 0 to 5% by weight, based on 100% by weight of the sum of reaction components b) through g), of one or more catalysts;
      f) 0 to 50% by weight, based on 100% by weight of the sum of reaction components b) through g), of one or more fillers; and
      g) 0 to 25% by weight, based on 100% by weight of the sum of reaction components b) through g), of one or more auxiliary substances and/or additives, wherein said one or more auxiliary substances and/or additives is selected from the group consisting of stabilizers, coloring agents, flameproofing agents, and plasticizers;
   wherein said polyurethane is formed by the reaction of a) with b) in the presence of c) and d) and optionally in the presence of e), f), and g),
   wherein the isocyanate index of the polyurethane foam forming reaction mixture ranges from 70 to 130, and
   wherein said polyurethane foam has a compression set of less than or equal to 0.01%, according to DIN EN ISO 1856; 40%, 5 min., 25° C.

2. The process as claimed in claim 1, wherein component g) is selected from the group consisting of coloring agents, flame proofing agents, and plasticizers.

3. The process as claimed in claim 1, wherein component g) is a coloring agent.

4. The process as claimed in claim 1, wherein component g) is a flame proofing agent.

5. The process as claimed in claim 1, wherein component g) is a plasticizer.

6. The process as claimed in claim 1, wherein the one or more blowing agents are present in the amount of 0.3 to 3.5% by weight, based on 100% by weight of the sum of reaction components b) through g).

7. The process as claimed in claim 6, wherein component f) is present.

8. The process as claimed in claim 6, wherein component g) is present.

9. The process as claimed in claim 1, wherein component b) is at least one or more polyetherpolyols having a functionality of 1.8 to 6.

10. The process as claimed in claim 1, wherein component e) is present.

* * * * *